Jan. 13, 1970

F. B. EASTON 3,489,423

SLED TRAINER

Filed Sept. 4, 1968

INVENTOR.
FRANK B. EASTON
BY
*W. B. Hangman*
ATTORNEY

Jan. 13, 1970 F. B. EASTON 3,489,423
SLED TRAINER
Filed Sept. 4, 1968 2 Sheets-Sheet 2
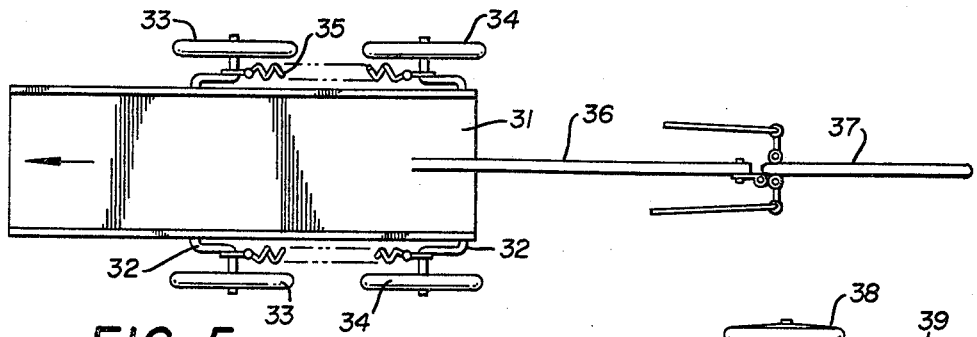
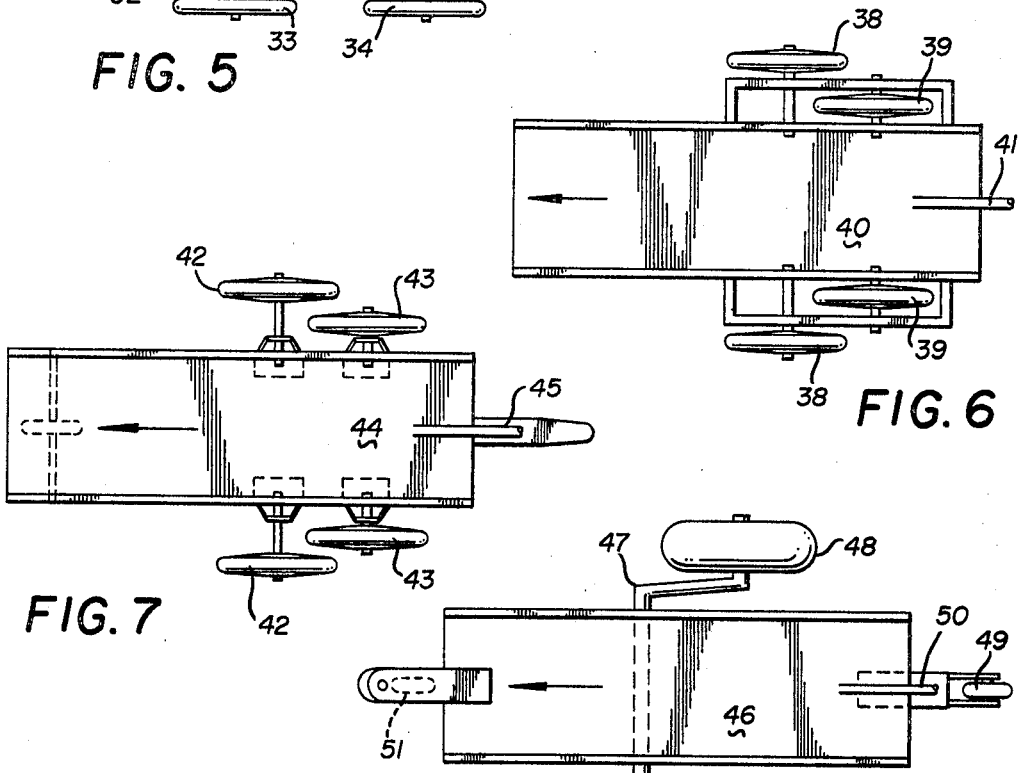
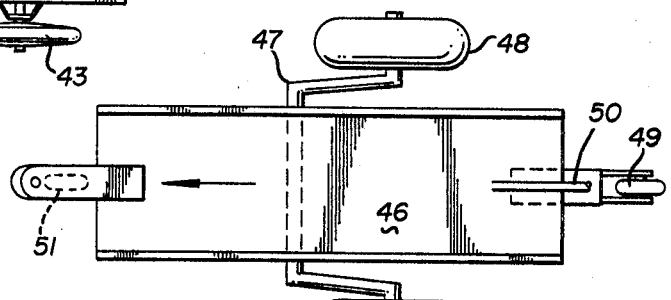
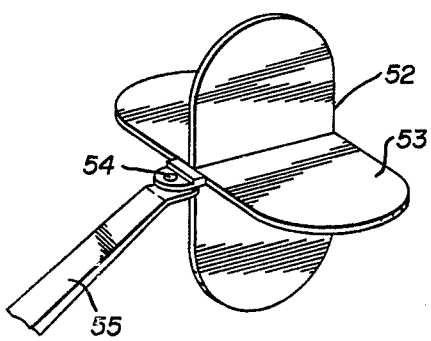
INVENTOR.
FRANK B. EASTON
BY
W. B. Harpman
ATTORNEY United States Patent Office 3,489,423
Patented Jan. 13, 1970

3,489,423
SLED TRAINER
Frank B. Easton, R.D. 2, Salem, Ohio 44460
Filed Sept. 4, 1968, Ser. No. 757,331
Int. Cl. B62b 13/18; B62d 13/08
U.S. Cl. 280—1     3 Claims

ABSTRACT OF THE DISCLOSURE

A sled like vehicle equipped with a manually operated rudder for training an individual in the principles of air rudder controlled direction of travel and usable as a sporting device. The vehicle being adapted for use on snow covered hills in its sled form and on paved areas by the addition of supporting wheels thereto.

BACKGROUND OF THE INVENTION

Field of the invention

This invention relates to training devices and more particularly those utilizing an air rudder for control of the direction of travel of the device.

Description of the prior art

The prior structures utilizing air rudders have generally comprised airplanes and gliders and wherein the rudders are used in addition to elevators for controlling the flight path of the airplane or glider. Training planes and simple glider forms may be considered as trainer units. No prior art is known wherein the vehicle is surface oriented and steering control is by way of an air rudder.

SUMMARY OF THE INVENTION

A sled trainer in the form of a vehicle of sled like configuration and specifically bowed longitudinally and preferably bowed transversely and mounting on elevated air rudder together with manually operated means for controlling the position of the air rudder whereby the device upon sliding down a hill may be steered through the action of the air rudder to acquaint the user with the principles of air rudder utility.

DESCRIPTION OF THE DRAWINGS

FIGURE 5 is a top plan view of the modified form of sled trainer seen in FIGURE 4.

FIGURE 6 is a top plan view with parts broken away showing a further modification of a wheeled form of sled trainer.

FIGURE 7 is a top plan view of a further modification of a wheeled form of a sled trainer with parts broken away and FIGURE 8 is a top plan view with parts broken away of a still further form of wheeled sled trainer.

FIGURE 9 is a perspective view of a combined rudder and fixed elevator usable in any of the other illustrated forms of the invention.

DESCRIPTION OF THE PREFERRED EMBODIMENT

Figure 1:
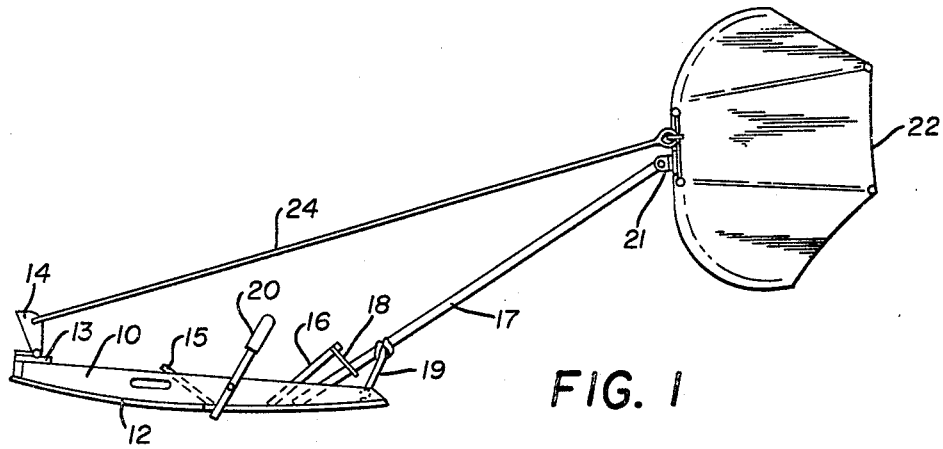
FIGURE 1 is a side elevation of the sled trainer.
Figure 2:
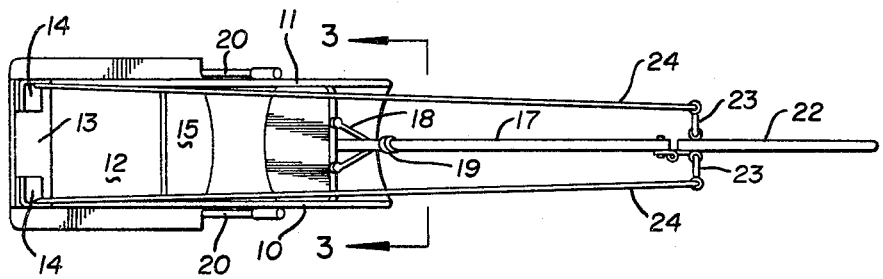
FIGURE 2 is a top plan view of the sled trainer.
Figure 3:
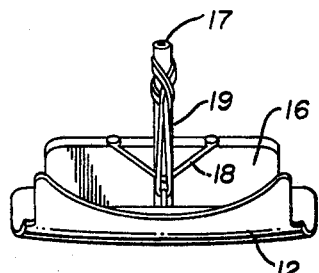
FIGURE 3 is a rear elevation of the sled trainer with part of the rudder support broken away.

In its simplest form, the sled trainer as seen in FIGURES 1, 2, and 3 of the drawings comprises a sled body having spaced side rails 10 and 11 mounted on a longitudinally and transversely curved bottom portion 12.

The forward end of the bottom portion 12 provides sideward extensions of the bottom portion 12 with respect to the side rails 10 and 11 and at its foremost end carries a transverse supporting member 13 on which a pair of rudder control pedals 14 are pivotally mounted. A seat portion 15 is angularly positioned midway between the ends of the sled trainer and an oppositely disposed angularly positioned back portion 16 is similarly positioned in space relation to the seat portion.

A rudder support mast 17 is attached to the back portion 16 by a bifurcated bracket 18 as may be best seen in FIGURES 2 and 3 of the drawings. The rudder support mast 17 is also secured to the bottom portion 12 of the sled trainer by a flexible member 19 which is positioned directly to the rear of the bifurcated bracket 18. Drag type brakes consisting of individual hand operated levers 20 are positioned one one either side of the sled trainer and pivoted to the side rails 10 and 11. The upper outermost end of the rudder support mast carries a hinge construction 21 which directly and movably mounts a rudder 22 which is vertically disposed and provided with sidewardly extending arms 23 to the ends of which rudder actuating cables 24 are attached. The forward ends of the rudder actuating cables 24 are directly connected with the rudder control pedals 14 heretofore described and it will thus be seen that a person sitting in the sled trainer on the bottom 12 and seat portion 15 thereof is in convenient position to place his feet on the rudder control pedals 14 leaving his hands free for grasping hand holes in the side rails 10 and 11 and/or the brake levers 20.

Still referring to FIGURE 1 of the drawings, it will be observed that the bottom 12 of the sled trainer is bowed longitudinally so that the middle portion thereof is lower than either the forward or the rearward ends and by referring to FIGURE 3 of the drawings, it will be seen that the bottom 12 is also bowed transversely so that the middle portion thereof is lower than either of the side sections. Thus, there is provided a central area which is lower than the remaining area of the bottom 12 and which facilitates a pivoting or turning action as occasioned by the rudder control and which of course enhances the steerability of the sled trainer responsive to the rudder action thereof.

Those skilled in the art will observe that while the preferred embodiment of the invention takes the form of a sled and is usable on snow covered slopes, it is possible to form the invention with wheels so arranged that they provide a similar degree of freedom of motion with respect to the sled trainer as occasioned by the action of the rudder.

Figure 4:
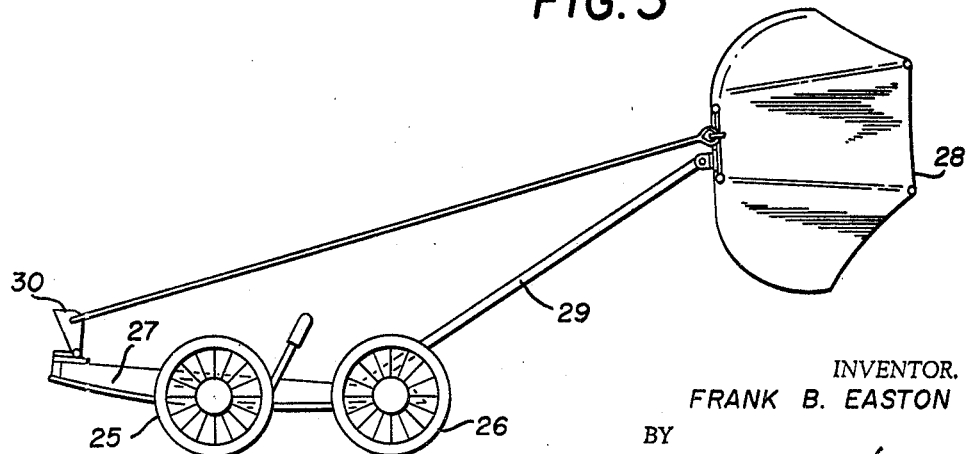
FIGURE 4 is a side elevation of a modified form of sled trainer showing the addition of wheels.

By referring to FIGURE 4 of the drawings, one such form of wheel suspension may be seen and in this particular arrangement either the front wheels 25 or the rear wheels 26 are mounted on axles with king pin assemblies so that they are steerable. The trainer of FIGURE 4 includes the sled like body portion 27, the rudder 28 supported on a boom 29 and controlled by rudder control pedals 30.

The turning action of the wheels 26 or 25 is a castor like motion solely responsive to the turning motion imparted the sled like body 27 by the rudder action.

In FIGURE 5 of the drawings, the still further modification may be seen wherein the wheeled sled trainer comprises a body 31 having spaced pairs of axles 32, each of which are formed with crank arms adjacent their outermost ends on which wheels 33 and 34 are mounted; by shifting the weight of the user the sled trainer of FIGURE 5 will be supported largely on one pair of wheels or the other and thereby capable of being turned. Springs 35 interconnect the crank arm portions of the axles and facilitate a steering operation through the assembly. A rudder post 36 supports a steering rudder 37 and the usual controls are provided but not illustrated in FIGURE 5 of the drawings.

In FIGURE 6 of the drawings, still a further modification of a wheeled arrangement is illustrated in which pairs of wheels 38 and 39 are mounted outboard of the sled trainer body 40 which has the rudder supporting mast 41 on one end thereof and here again shifting of the weight of the user results in a pivoting action by reason of the weight being carried on one or the other of the pairs of wheels 38 and 39.

A still further variation of this principle is seen in FIGURE 7 of the drawings wherein pairs of wheels 42 and 43 are mounted on brackets carried on the sled trainer body 44 and again a rudder mast 45 is provided and a rudder not shown is mounted thereon and controlled in the usual and hereinbefore described manner.

In FIGURE 8 of the drawings a still further modification of a wheel suspension for the sled trainer may be seen wherein the body 46 has a single axle 47 with rather large supporting wheels 48 on crank like ends thereon, the sled like body 46 being provided with a trailing wheel 49 and the usual rudder supporting mast 50. Here again, shifting of the weight of the user permits ready turning based on single axle suspension and a single pair of wheels while normal operating conditions include the use of the trailing wheel 49 as a support. Alternately and optionally a leading wheel 51 may be provided.

Many other variations of wheel supports will occur to those skilled in the art and wherein limited engagement with a supporting surface may be had at such times as it is desired to change the directional course of the sled trainer. In the several wheeled forms wherein shifting the weight results in a condition permitting turning motion to be imparted thereto by the rudder, the user has the increased advantage of learning to balance his weight against the body of the sled trainer cooperatively with the action of the rudder.

In FIGURE 9 of the drawings a combination rudder 52 and fixed elevator 53 may be seen pivotally mounted through a pivot construction 54 on the end of a supporting rudder mast 55 which construction can be substituted for the rudder heretofore described in connection with any one of the several variations of the sled trainer illustrated and described herein.

While several embodiments of the present invention have been illustrated and described, it will be apparent to those skilled in the art that various other changes and modifications may be made in the invention without departing from the spirit thereof.

Having thus described my invention, what I claim is:

1. A sled trainer for an individual and comprising a sled like vehicle consisting of a longitudinally and transversely bowed rectangular bottom portion having a pair of spaced side rails thereon, a transverse front section on one end of said bottom portion and seat and back portions on said bottom portion between said side rails, rudder control pedals on said transverse front section and an upwardly and rearwardly extending mast on the other end of said bottom portion, a vertically disposed rudder movably mounted on said mast and having an area substantially equal to the area of said longitudinally and transversely bowed bottom portion, and flexible means interconnecting and movable rudder and said rudder control pedals whereby said rudder may be moved thereby.

2. The sled trainer for an individual set forth in claim 1 and wherein said side rails are apertured to serve as hand holds for said individual and wherein said seat and back portions are inclined in oppositely disposed relation to one another.

3. The sled trainer for an individual set forth in claim 1 and wherein the overall length of the sled trainer including the bottom portion and the rudder is at least double the length of the bottom portion.

References Cited

UNITED STATES PATENTS

| 1,816,118 | 7/1931 | Knight | 180—3 |
| 1,864,041 | 6/1932 | Emigh | 180—3 |
| 1,946,018 | 2/1934 | Fredrickson | 180—3 |
| 2,198,667 | 4/1940 | Hagenes | 280—87.04 |
| 2,249,374 | 7/1941 | Davis | 180—3 |
| 2,436,619 | 2/1948 | Swindell | 280—242 |

LEO FRIAGLIA, Primary Examiner

ROBERT R. SONG, Assistant Examiner

U.S. Cl. X.R.

114—43; 280—87.1